Patented May 9, 1950

2,507,471

UNITED STATES PATENT OFFICE 2,507,471

THIOCYANATED ETHER OF 4-VINYLCYCLO-HEXENE AND ITS PREPARATION

Herbert L. Johnson, Media, and Archibald P. Stuart, Norwood, Pa., assignors to Sun Oil Company, Philadelphia, Pa., a corporation of New Jersey No Drawing. Application August 19, 1947, Serial No. 769,539

3 Claims. (Cl. 167—30)

This invention relates to the preparation of a novel compound. More particularly it relates to a novel compound, namely, the thiocyanated derivative of the reaction product of monochloroethyl alcohol and 4-vinylcyclohexene.

In copending application for Patent Serial No. 782,020 filed October 24, 1947, by the instant inventors, the preparation of the reaction product of monochloroethyl alcohol and 4-vinylcyclohexene is described and claimed. The product is also claimed. In that application the aforesaid reaction product is prepared by causing monochloroethyl alcohol, i. e. ethylene chlorohydrin, and 4-vinylcyclohexene to interact in presence of catalytic quantities of a concentrated mineral acid. To effect the reaction 4-vinylcyclohexene is added over a period of time to an admixture of the chlorohydrin and the acid. The reaction is maintained at an elevated temperature, say, 100° C., to complete the reaction. Caustic alkali is employed to neutralize the acid following which the reaction mass is refluxed with benzene until dry. Neutralization products are then removed. The product obtained has a boiling point of 90° C.–92° C. at 3 mm. Hg. The product obtained appears to contain at least one ether linkage per molecule.

According to this invention the aforesaid reaction product is treated with an alkali metal thiocyanate or with ammonium thiocyanate to replace a halogen in the molecule with the thiocyano group (—SCN). Copper powder catalyst and a suitable solvent such as methyl isobutyl ketone are employed to effect the reaction.

The following example illustrates the invention:

Example

The ether product derived from 4-vinylcyclohexene (38 g.=0.2 mole) was stirred and refluxed with 81.1 g. (1 mole) of sodium thiocyanate and 2.0 g. of copper powder in the presence of 200 g. of methyl isobutyl ketone as a solvent for a period of 48 hours. The reaction mixture was diluted with water, extracted with ether and dried. After removal of all solvents under vacuum, there was left a residue of 22 g. of a dark colored oil which consisted predominantly of the desired thiocyanated ether product.

Calculated for $C_{11}H_{17}NOS$, S, 15.17%. Found: S, 13.44%.

The product of the invention tends to decompose upon heating, even under reduced pressure. Hence, it is not practical to distill the same.

The reaction product of mono-chloroethyl alcohol and 4-vinylcyclohexene is probably a composite of several distinct ether products. Thus, it is believed that the thiocyanated product of this invention is also composed of several distinct thiocyanated ethers.

The product of this invention is effective as an insecticide. Thus, we have found that the thiocyanated reaction product of said reaction product of monochloroethyl alcohol and 4-vinylcyclohexene possesses desirable insecticidal activity, particularly against the common house-fly. A 5% solution of the product of this insecticide in "Deobase," a dearomatized kerosene solvent usually employed for insecticide sprays, tested by the standard Peet-Grady method gave the following results:

| | |
|---|---|
| Total number of flies used | 822 |
| Per cent kill in 24 hours | 25.7 |
| Official test insecticide per cent kill in 24 hours | 50.7 |
| Official test insecticide, difference in | —25 |
| Sample knockdown in 10 minutes | 94.6 |
| Official test insecticide knockdown in 10 minutes | 95.5 |
| Difference from official test insecticide | —.9 |

Thus, the product of the invention possesses kill as well as good knockdown properties.

According to this invention, therefore, there is provided a novel insecticidal composition comprising the thiocyanated reaction product of the reaction product of monochloroethyl alcohol and 4-vinylcyclohexene and a carrier or vehicle therefor.

As carrier or vehicle there can be used those already well known in the art. Thus, in addition to that already mentioned, there can be used the usual solid carriers, such as pyrophyllite, or other liquid hydrocarbon solvents and other solvents, and gaseous propellants such as the gaseous halogenated hydrocarbons.

We claim:

1. The thiocyanated reaction product obtained upon causing ethylene chlorohydrin to interact with 4-vinylcyclohexene in substantially molar proportions at elevated temperature and then treating the product thus obtained with an alkali metal thiocyanate in presence of metallic copper catalyst.

2. The preparation of a thiocyanated derivative of 4-vinylcyclohexene which comprises the steps of causing ethylene chlorohydrin to interact with 4-vinylcyclohexene in substantially molar proportions at elevated temperature, then treating the product thus obtained with an alkali metal thiocyanate in the presence of a metallic copper catalyst and then separating the desired thiocyanated product from the reaction mass.

3. A novel insecticidal composition of matter comprising as an essential active ingredient the thiocyanated reaction product obtained upon causing ethylene chlorohydrin to interact with 4-vinylcyclohexene in substantially molar proportions at elevated temperature and then treating the product thus obtained with an alkali metal thiocyanate in presence of metallic copper catalyst, and a carrier therefor.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,239,080 | Coleman | Apr. 22, 1941 |
| 2,376,105 | Williams | May 15, 1945 |
| 2,394,583 | Bruson | Feb. 12, 1946 |
| 2,395,455 | Bruson | Feb. 26, 1946 |
| 2,409,329 | Williams | Oct. 15, 1946 |
| 2,412,799 | Bruson | Dec. 17, 1946 |
| 2,425,185 | Haury | Aug. 5, 1947 |